(12) United States Patent
Liu

(10) Patent No.: US 6,935,304 B1
(45) Date of Patent: Aug. 30, 2005

(54) INCREASING THE DURATION OF PEAK COMBUSTION PRESSURE IN CYLINDERS OF A DIESEL ENGINE USING FUEL INJECTION CONTROL STRATEGIES

(75) Inventor: Zhengbai Liu, Naperville, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 18 days.

(21) Appl. No.: 10/802,987

(22) Filed: Mar. 17, 2004

(51) Int. Cl.[7] ............................................. F02B 3/10
(52) U.S. Cl. ...................................... 123/299; 123/435
(58) Field of Search .................................. 123/299, 435

(56) References Cited

U.S. PATENT DOCUMENTS

| | | | |
|---|---|---|---|
| 2,534,322 A | * | 12/1950 | Thaheld ...................... 123/256 |
| 4,397,285 A | | 8/1983 | O'Neill |
| 4,513,714 A | | 4/1985 | Dolenc et al. |
| 5,522,359 A | | 6/1996 | Collin |
| 5,704,210 A | | 1/1998 | Wang |
| 6,295,816 B1 | | 10/2001 | Gallagher et al. |
| 6,354,268 B1 | | 3/2002 | Beck et al. |
| 6,378,487 B1 | | 4/2002 | Zukouski et al. |
| 6,516,781 B2 | | 2/2003 | Weisman |
| 6,619,255 B2 | * | 9/2003 | Urushihara et al. ......... 123/435 |
| 6,659,068 B2 | * | 12/2003 | Urushihara et al. ......... 123/299 |

* cited by examiner

*Primary Examiner*—Erick Solis
(74) *Attorney, Agent, or Firm*—Dennis Kelly Sullivan; Susan L. Lukasik; Jeffrey P. Calfa

(57) ABSTRACT

A diesel engine fuel injection strategy comprises injecting fuel into a cylinder (28) during a compression upstroke of a piston (30) that reciprocates within the cylinder and creating pressure sufficient to initiate combustion of the injected fuel. As the fuel is combusting, more fuel is injected at a controlled rate of injection to cause further combustion of fuel in a manner that upon substantially peak in-cylinder pressure being attained is effective to prolong that peak in-cylinder pressure such that a trace (62B) of pressure vs. crank angle would contain a distinct plateau (62P) representing the prolonged peak pressure.

6 Claims, 4 Drawing Sheets

INCREASING THE DURATION OF PEAK COMBUSTION PRESSURE IN CYLINDERS OF A DIESEL ENGINE USING FUEL INJECTION CONTROL STRATEGIES

FIELD OF THE INVENTION

This invention relates generally to internal combustion engines. More specifically it relates to increasing the power output of a diesel engine by increasing the duration of peak combustion pressure in the cylinders through the use of fuel injection control strategies.

BACKGROUND OF THE INVENTION

At some crank angle in an engine cycle after the beginning of combustion in a cylinder, cylinder pressure reaches a maximum, or peak, value. Typically, that peak pressure exists for only a minute fraction of the engine cycle, and in a trace of cylinder pressure vs. crank angle, the duration of peak pressure would appear essentially as a single point of the trace, as shown for example in FIG. 3 of U.S. Pat. No. 4,397,285. It is known that the area under such a pressure trace at least approximates the engine power output. Prolonging the duration of peak pressure could be an effective way to increase the area under the pressure trace, and hence power output, if that extended duration does not cause offsetting power loss due to post-peak decreases in pressure.

The nature of a diesel engine and its fuel injection system allows fuel to be injected even after combustion has commenced within a cylinder. The fuel injection process during an engine cycle is some generally described in terms of phases, such as pilot injection, main injection, and post-injection. Any particular fuel injection process typically always comprises a main fuel injection, with pilot and post-injection being optional possibilities.

Contemporary fuel injection systems allow injection pressure, injection rate, and injection timing to be fairly accurately controlled. The inventor has recognized that such control capabilities can be used to accomplish the goal of prolonging the duration of peak pressure for increasing the power output of a diesel engine.

U.S. Pat. No. 5,522,359 describes a method of fueling a diesel engine in a manner that limits peak pressure in order to limit in-cylinder temperature rise for the purpose of limiting $NO_x$ formation. A single pulse is used for an injection, and its timing occurs so as to cause combustion to occur during the downward expansion stroke.

Principles of the present invention can be embodied in fuel injection control strategies that use more than one discrete injection pulse, in particular by implementing such strategies in the processing system that processes various data to control the operation of the fuel injectors that inject fuel into the engine cylinders.

Controlling fuel injections in a manner that properly controls the rate at which fuel is being injected as a function of crank angle can be effective to accomplish the desired goal. Exactly how fuel injections will be controlled in any given engine depends on specifics of the engine, the fuel injection system, and the processing system that controls the fuel injection system. For example, fuel must obviously be injected at a pressure greater than in-cylinder pressure, but control of injection pressure by itself may not necessarily control the instantaneous rate of fuel injection because of other factors that are present, such as the design of the particular fuel injectors or the crank angle at which fuel actually beings to combust and release energy into a cylinder.

For certain engines, fuel injection systems, and processing systems, the control of fuel injection pressure and the number of fuel injections, including the timing and duration of each injection, may be sufficient to at least approximately define a desired trace of rate of fuel injection vs. crank angle that will result in prolonging the duration of peak cylinder pressure in a way that increases per-cylinder power output.

Because an engine that powers a motor vehicle will run at different speeds depending on how the vehicle is being driven, the crank angle at which peak pressure occurs may change with engine speed. Hence, the task of successfully prolonging peak pressure at different engine speeds depends on the capacity of the processing system to store a number of data maps that will store data that can be used in the calculation of fueling data to assure proper control of the fuel injection system within each of multiple speed ranges. The data stored in the maps is obtained by mapping a base engine for various combinations of engine speed and load to develop the data that needs to be stored in the processing system for use in calculating engine fueling data. The engine fueling data will cause the engine to be fueled in such a way that the rate at which the combusting fuel is releasing energy will cause the peak in-cylinder pressure to be prolonged for a greater fraction of an engine cycle than has heretofore been possible.

It is to be understood that the mapping of an engine that achieves this goal results from investigation and analysis of many factors. Knowledge of the combustion chamber design and of the capabilities of the fuel injection system and the associated processing system forms a starting point in mapping an engine. As long as the fuel injection and processing systems are capable of providing the necessary degree of control accuracy, the goal of prolonging peak in-cylinder pressure becomes attainable, albeit that different factors might be used for control in different systems depending on specifics of those systems.

With knowledge of how a given fuel injection system and associated processing system perform, and with knowledge of how combustion occurs within the cylinders of a particular engine, it becomes possible to correlate in-cylinder pressure resulting from combustion of injected fuel with the rate at which the combusting fuel is releasing energy. A peak pressure can be prolonged for a limited fraction of the engine cycle in an engine cylinder by controlling the rate at which additional fuel is injected into the cylinder once fuel already in the cylinder has started to combust and is releasing energy.

For any given speed and load the data entered into a map can be obtained through from engineering analysis and/or actual data from a running engine.

For certain speeds and loads, only two discrete injection pulses, each of suitable timing and duration, may be sufficient for initiating combustion within a cylinder to the point of maximum pressure and prolonging that maximum pressure for a limited fraction of the engine cycle in a way that increases the power output. Such a combination of pulses may be a main pulse that is preceded by a pilot injection pulse or a main pulse that is followed by a post-injection pulse.

For other speeds and loads, more than two discrete injection pulses may be required, such as one or more pilot injections and/or one or more post-injections accompanying a main fuel injection, may be needed in order to cause the combusting fuel to reach maximum pressure and then prolong that maximum pressure for a limited fraction of the engine cycle so as to increases the power output. Moreover, each such injection, whether it be a pilot injection, a main injection, or a post-injection, must be defined by timing, duration, and fuel pressure.

Consequently, the task of mapping an engine requires a developmental effort where multiple solutions become entirely possible due to the number of variables and possible combinations of those variables. However, once a base engine has been mapped and appropriate solutions selected as a result of the development effort, the mapping may be used in the mass production of the engine to the benefit of end users of the engines.

SUMMARY OF THE INVENTION

The present invention relates to a method for prolonging peak in-cylinder pressure in a diesel engine. Diesel fuel is injected into a cylinder during a compression upstroke of a piston that reciprocates within the cylinder and creates pressure sufficient to initiate combustion of the injected fuel. As the fuel is combusting, more fuel is injected at a controlled rate of injection to cause further combustion of fuel in a manner that upon substantially peak in-cylinder pressure being attained is effective to prolong that peak in-cylinder pressure such that a trace of pressure vs. crank angle would contain a distinct plateau representing the prolonged peak pressure. At least two discrete fuel injections are used to accomplish this.

The invention also relates to an engine that embodies the described strategy.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
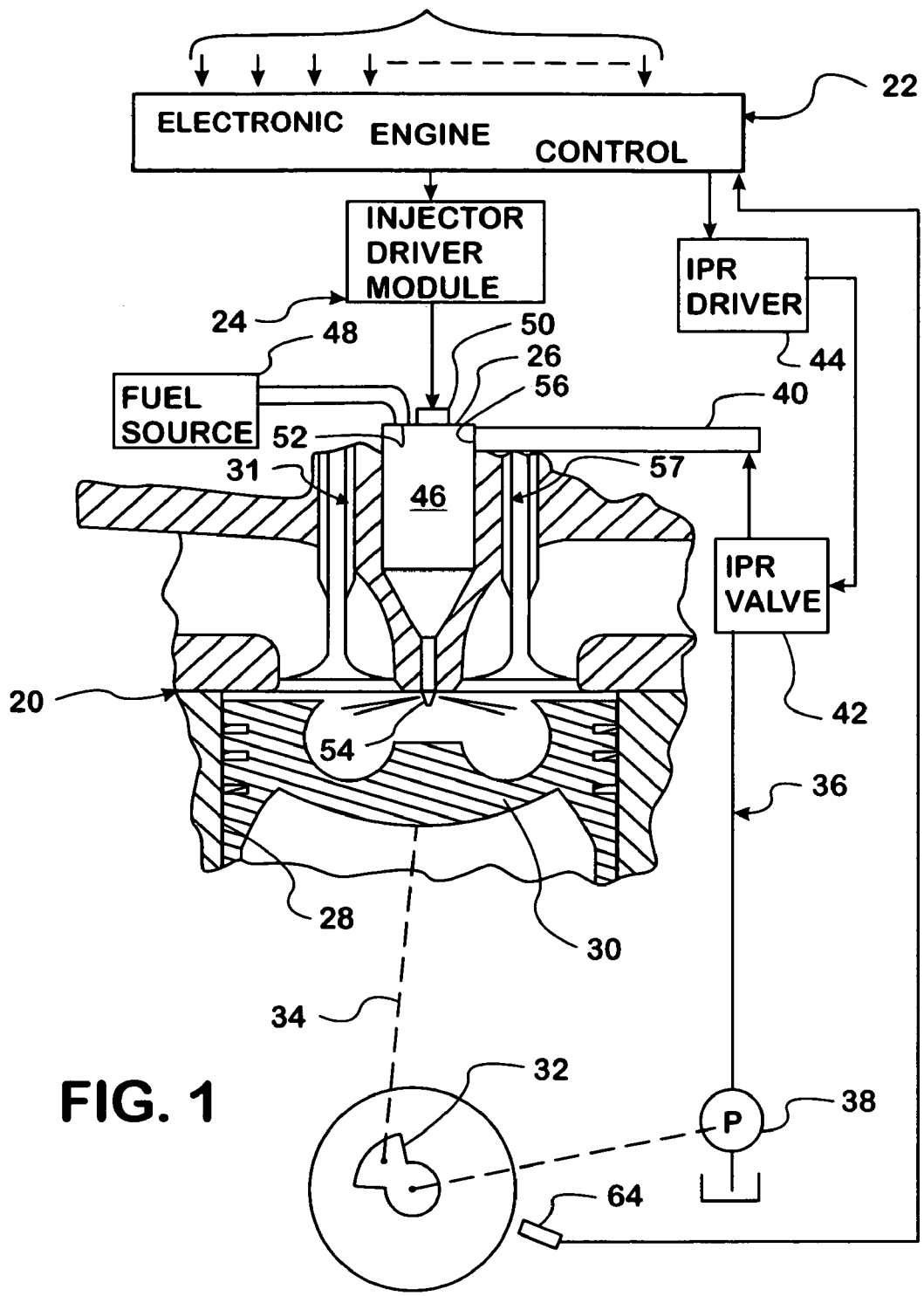
FIG. 1 is a general schematic diagram of a portion of an exemplary diesel engine.

FIG. 1 shows a schematic diagram of a portion of an exemplary diesel engine 20 for powering a motor vehicle. A processor-based electronic engine control system 22 processes data from various sources to develop various control data for controlling various aspects of engine operation. The data processed by control system 22 may originate at external sources, such as sensors, and/or be generated internally.

Control system 22 includes an injector driver module 24 for controlling the operation of electric-actuated fuel injection devices 26. Each device 26 mounts on the engine in association with a respective engine combustion chamber illustrated by an engine cylinder 28 within which a piston 30 reciprocates. Intake air is delivered to cylinder 28 through an intake system when an intake valve 31 is open. Each piston is coupled to a crankshaft 32 by a corresponding connecting rod 34. A processor of control system 22 can process data sufficiently fast to calculate, in real time, the timing and duration of device actuation to set both the timing and the amount of fueling.

Engine 20 further comprises an oil system 36 having a pump 38 for drawing oil from a sump and delivering the oil under pressure to an oil rail 40 that serves in effect as a manifold for supplying oil, as a control fluid, to the individual devices 26. An injection pressure regulator (IPR) valve 42 is under the control of control system 22 via an IPR driver 44 to regulate the hydraulic pressure of oil in oil rail 40.

Each device 26 comprises a body 46 that mounts on engine 20 in association with oil rail 40, a respective cylinder 28, and a source of fuel 48. Device 26 has an electrical connector 50 that provides for the electrical connection of its actuator to injector driver module 24. Fuel source 48 supplies liquid fuel to a fuel inlet port 52 of body 46. Body 46 further comprises a fuel outlet port, i.e. a nozzle 54, through which fuel is injected into cylinder 28, and a control fluid inlet port 56 that is communicated to the oil in oil rail 40.

The hydraulic pressure of the oil in rail 40 provides injector control pressure, or ICP. Control system 22 establishes a desired set-point for ICP and causes valve 42 to operate in a way that forces actual ICP in rail 40 to the desired set-point. As engine 20 runs and changing conditions call for change in the ICP set-point, the strategy continues to force actual ICP to follow the changing desired set-point for ICP.

Each device 26 has a plunger that, during the injecting phase of device operation, is displaced within an internal pumping chamber by oil at ICP from oil rail 40 to force fuel out of the pumping chamber. The timing and the stroke of the plunger are also controlled by control system 22. ICP applied through the plunger to act on the fuel in the pumping chamber, amplifying the pressure of fuel to a magnitude large enough for forcing a normally closed control valve in nozzle 54 to open so that the amplified fuel pressure forces the fuel through the nozzle into cylinder 28 as the plunger is being displaced. Actual ICP in rail 40 is controlled by control system 22 acting on IPR valve 42 via driver 44.

Control of ICP and of the timing and stroke of the injector device plunger controls how fuel is injected into cylinder 28 and such control capability can therefore be used to implement the inventive strategy. In a diesel engine it is the pressure within cylinder that is effective to initiate combustion of fuel, and it is to an exhaust system that diesel exhaust gases resulting from combustion pass when an exhaust valve 57 is open.

Figure 2:
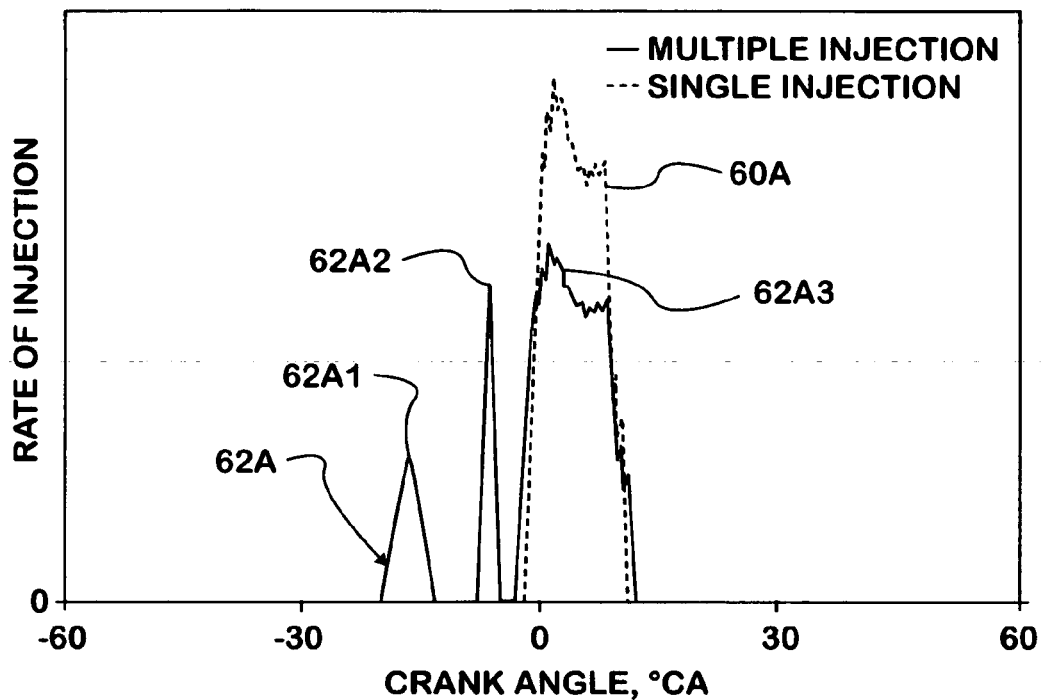
FIG. 2 is a graph comparing representative fuel injection strategies to illustrate accomplishment of the objective of prolonging peak in-cylinder pressure by the inventive strategy.

A first example of inventive strategy is described with reference to FIGS. 2 and 3. A broken line trace 60A in FIG. 2 shows rate of fueling, or rate of injection ROI, as a single main fuel injection pulse that begins just slightly earlier than 0° crank angle (top dead center or TDC) Crank angle data is supplied to control system 22 from a sensor 64. The amount of fuel introduced is at least approximately represented by the area under the pulse.

Figure 3:
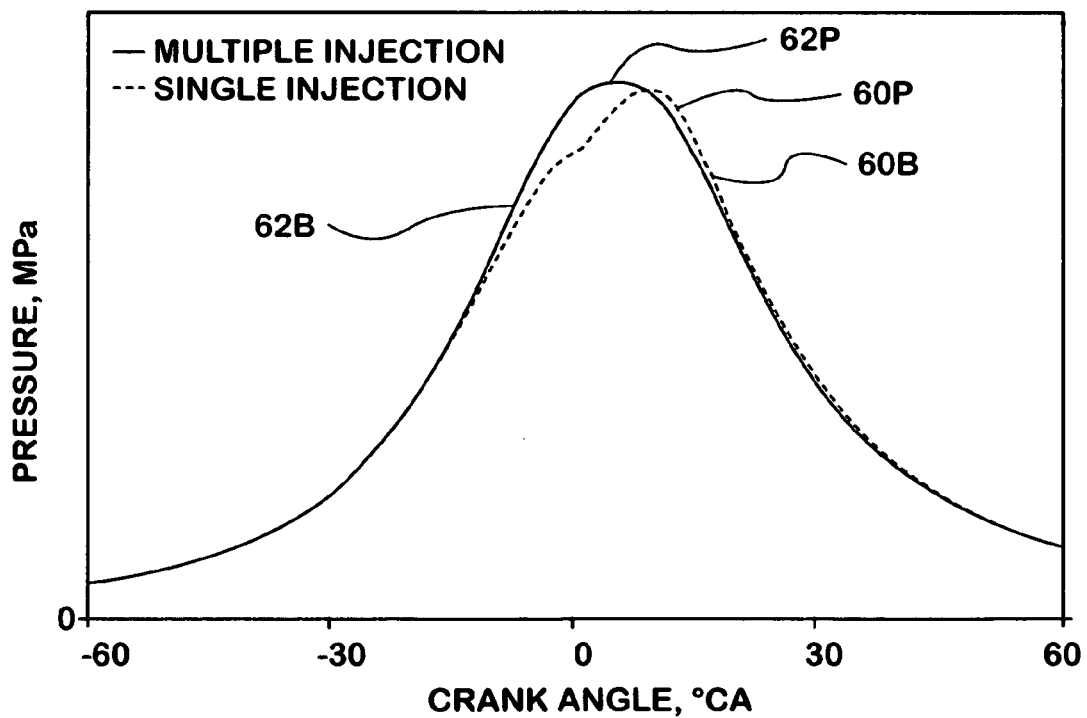
FIG. 3 is a graph showing in-cylinder pressure traces resulting from the respective strategies of FIG. 2.

A broken line trace 60B in FIG. 3 is a trace of in-cylinder pressure during the same engine cycle as trace 60A. The portion of trace 60B that occurs earlier than the beginning of pulse 60A corresponds to intake air being compressed within cylinder 28. As fuel begins to be injected into cylinder 28, a point is reached where the fuel begins to combust. This increases the in-cylinder pressure even more as piston 30 moves through TDC and begins the power downstroke. As the effective cylinder volume increases during the downstroke, the in-cylinder pressure falls off. Trace 60B has a peak pressure that is essentially just a single point 60P shortly after TDC.

The solid line trace 62A in FIG. 2 represents a strategy that embodies principles of the present invention. Fueling occurs as several distinct pulses 62A1, 62A2, 62A3. The former two could be considered pilot pulses and the latter one as a main pulse. The amount of fuel injected as a result of each pulse 62A1, 62A2, 62A3 corresponds at least approximately to the area under the respective pulse.

A solid line trace 62B in FIG. 3 is a trace of in-cylinder pressure during the same portion of the engine cycle as trace 62A. Early pilot injection of fuel creates an in-cylinder fuel-air charge that begins to combust earlier in the engine cycle than is the case for trace 60A. The combustion is augmented by the second pilot pulse 62A2 and thereafter by main pulse 62A3. This control of the combustion process releases energy into cylinder 28 in a controlled way that prolongs the duration of peak pressure, as portrayed by the distinct substantially flat plateau 62P of trace 62B. Comparison of traces 60B and 62B discloses that the area under trace 62B is greater than that under trace 60B, indicating greater power output. In this instance, the attainment of peak pressure occurs earlier in the engine cycle with the inventive strategy, and although the inventive strategy provides lower pressure in that portion of the cycle after the point where the two traces cross, some 6° or so after TDC, the earlier prolonged increase in pressure more than makes up for that later lower pressure, resulting in power gain.

It is also to be noted that the total amounts of fuel injected during the respective traces are same. Although trace 62A contains two pilot injections, the amount of fuel introduced during the main injection 62A3 is less than that introduced during the single pulse of trace 60A.

Figure 4:
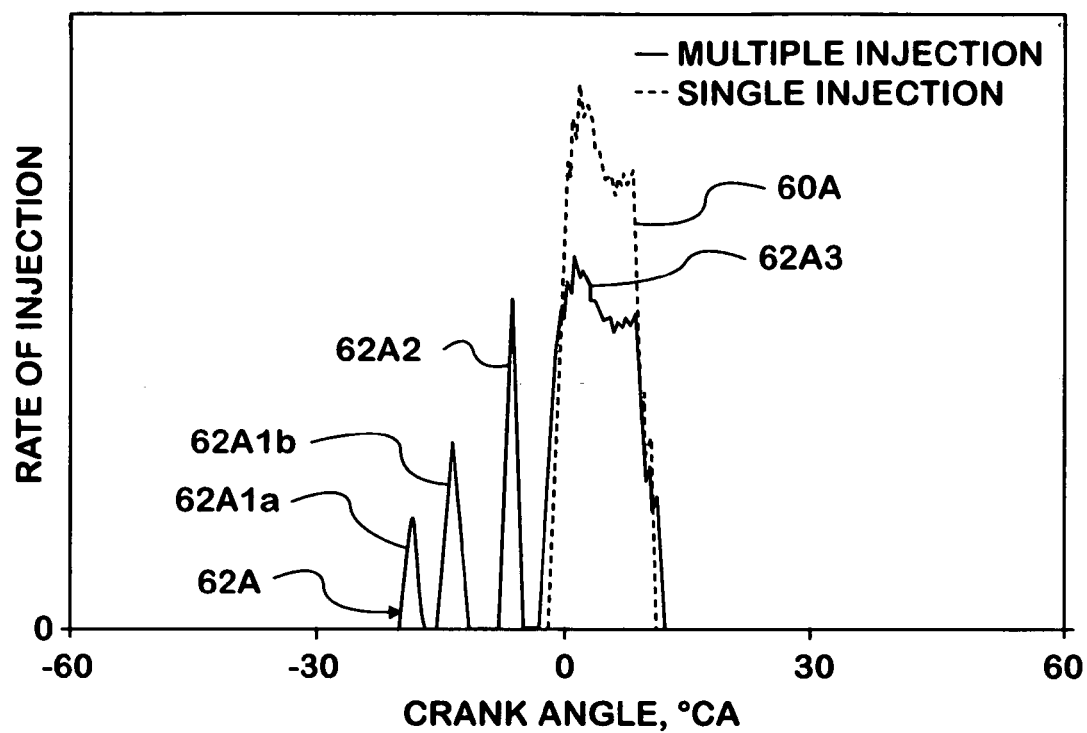
FIG. 4 is another graph comparing other representative fuel injection strategies to illustrate accomplishment of the objective of prolonging peak in-cylinder pressure by the inventive strategy.
Figure 5:
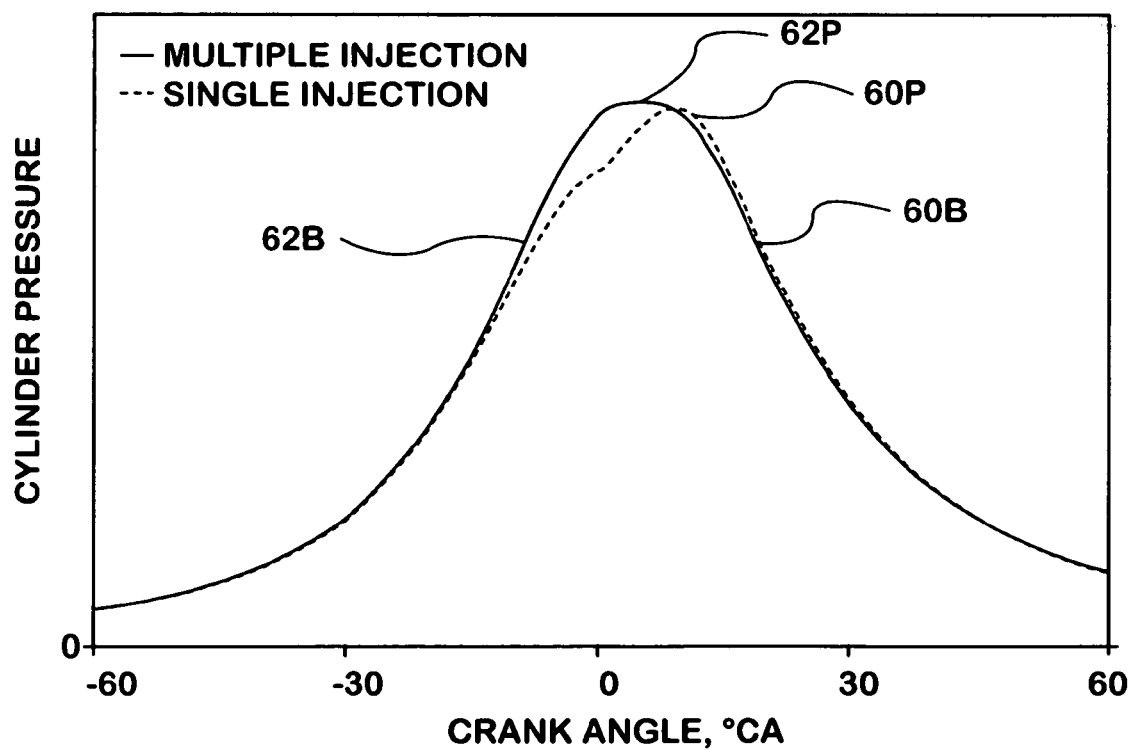
FIG. 5 is a graph showing in-cylinder pressure traces resulting from the respective strategies of FIG. 4.

FIG. 4 shows a comparison of respective injection strategies similar to the comparison of FIG. 2. The inventive strategy of FIG. 4 differs from the corresponding one of FIG. 2 in that two pilot pulses 62A1a and 62A1b replace the single pilot pulse 62A1. The resulting pressure trace 62B in FIG. 5 is essentially the same as trace 62B in FIG. 3.

The current invention has the following unique features:
1) It can be used in heavy-duty, medium-duty, and light-duty diesel engines.
2) It is very flexible, meaning it can be implemented in various combinations of injection pulses, based on various engine requirements.
3) The injection strategy will include at least one main injection and one or more pilot or/and post-injections.
4) The pilot injection number could be equal to one or greater than one.
5) The post injection number could be equal to one or greater than one.
6) The main injection number could also be greater than one.
7) The invention can be implemented in the processor alone, provided that the processor has sufficient capacity, and this makes the invention quite cost-effective.

Figure 6:
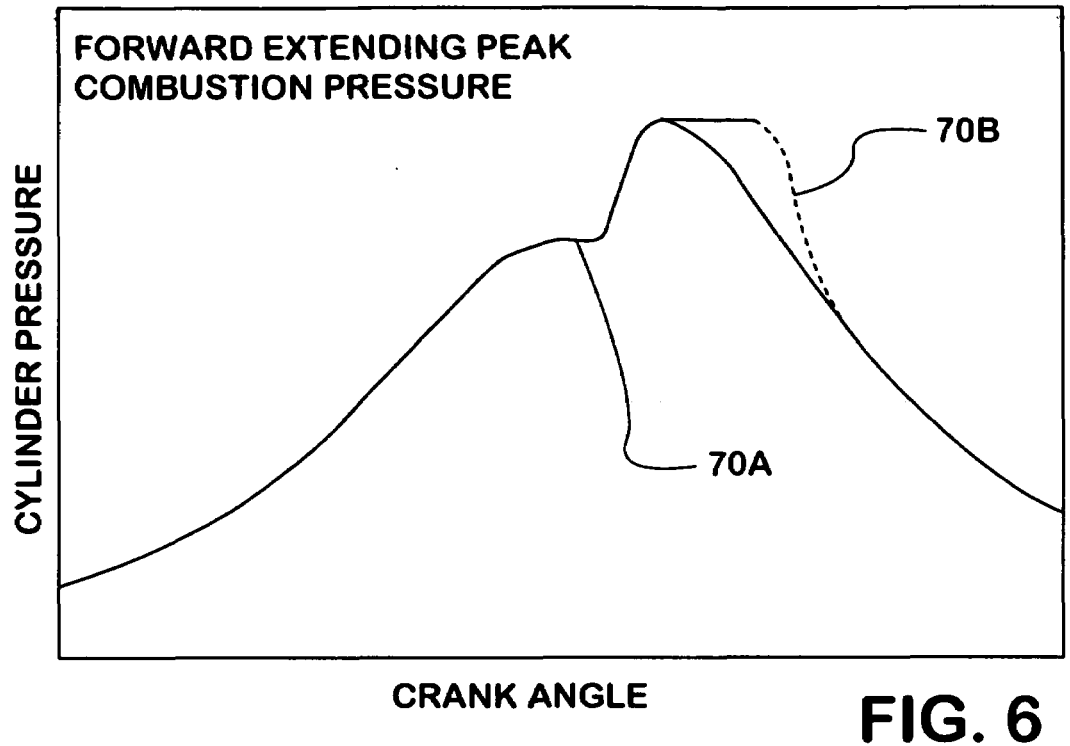
FIG. 6 is a graph showing in-cylinder pressure traces resulting from other respective fuel strategies.
Figure 7:
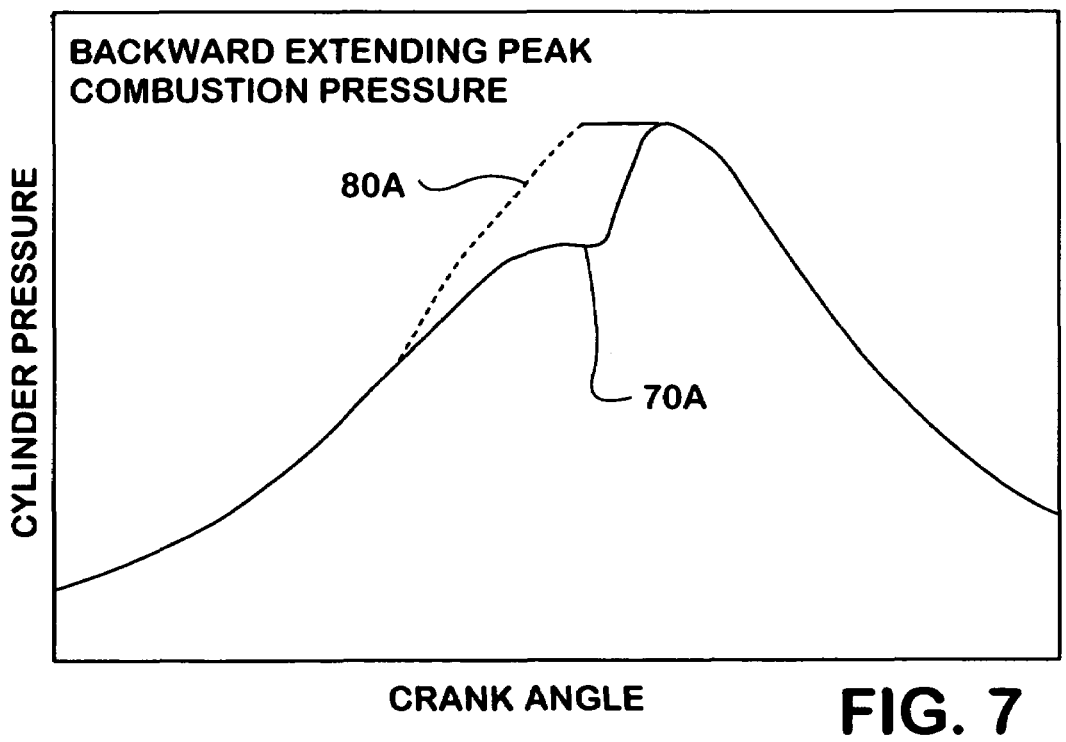
FIG. 7 is a graph showing in-cylinder pressure traces resulting from still other respective fuel strategies.

FIGS. 6 and 7 illustrate two more examples. The solid line trace 70A in FIG. 6 is a representative in-cylinder pressure trace using a strategy that does not use the present invention. The broken line trace 70B shows a prolonging of peak pressure using the inventive strategy. The extension occurs in the forward crank angle direction. The same solid line trace 70A is present in FIG. 7. The broken line trace 80B shows a prolonging of peak pressure using the inventive strategy, but with the extension occurring in the backward crank angle direction. In both examples the inventive strategy is effective to increase the power output.

Unlike the method of U.S. Pat. No. 5,522,359, the present invention does not involve increasing the engine compression ratio so that combustion can occur as the downstroke commences while the expanding cylinder volume limits the in-cylinder pressure as the combustion process continues. By contrast, the present invention allows pressure to increase after the commencement of combustion to a maximum, or peak, and thereafter prolong that peak pressure so that in a pressure trace, a distinct substantially flat plateau, rather than just a single point, defines the peak pressure.

While a presently preferred embodiment of the invention has been illustrated and described, it should be appreciated that principles of the invention apply to all embodiments falling within the scope of the following claims.

What is claimed is:

1. A method for prolonging peak in-cylinder pressure in a diesel comprising:
   a) injecting fuel into a cylinder during a compression upstroke of a piston that reciprocates within the cylinder and creating pressure sufficient to initiate combustion of the injected fuel, and
   b) as the fuel is combusting, injecting more fuel at a controlled rate of injection to cause further combustion of fuel in a manner that upon substantially peak in-cylinder pressure being attained is effective to prolong that peak in-cylinder pressure such that a trace of pressure vs. crank angle would contain a distinct plateau representing the prolonged peak pressure, wherein
   c) the combined injections of a) and b) comprise at least two discrete injection pulses.

2. A method as set forth in claim 1 wherein step a) is performed by at least one of the discrete injection pulses that begins and ends before top dead center in the engine cycle and step b) is performed by another of the discrete injection pulses that begins before top dead center and ends after top dead center.

3. A method as set forth in claim 1 wherein steps a) and b) are collectively effective to advance the timing of peak pressure such that the peak pressure is achieved slightly before top dead center in the engine cycle.

4. A diesel engine comprising:
   a) multiple cylinders into which a fueling system injects fuel during engine cycles; and
   b) an engine control system that controls the fueling system and causes the fueling system to inject fuel into each cylinder during a compression upstroke of a respective piston that reciprocates within the respective cylinder so that combustion of the injected fuel will be initiated by in-cylinder pressure created by the upstroking piston, and as the fuel is combusting, injects more fuel at a controlled rate of injection to cause further combustion of fuel in a manner that upon substantially peak in-cylinder pressure being attained is effective to prolong that peak in-cylinder pressure such that a trace of pressure vs. crank angle would contain a distinct plateau representing the prolonged peak pressure, wherein c) the combined injections of a) and b) comprise at least two discrete injection pulses.

5. A diesel engine as set forth in claim 4 wherein at least one of the discrete injection pulses begins and ends before top dead center in the engine cycle and another of the discrete injection pulses begins before top dead center and ends after top dead center.

6. A diesel engine as set forth in claim 4 wherein the discrete injection pulses are collectively effective to advance the timing of peak pressure such that the peak pressure is achieved slightly before top dead center in the engine cycle.

* * * * *